US007875092B2

(12) United States Patent
Christiansen et al.

(10) Patent No.: US 7,875,092 B2
(45) Date of Patent: Jan. 25, 2011

(54) SEPARATOR WITH AXIAL FLOW DEMISTING CYCLONE FOR SEPARATION OF MATERIAL COMPOSITIONS OF GAS, LIQUID AND PARTICULATE SOLIDS

(75) Inventors: Bjorn Christiansen, Trondheim (NO); Knut Sveberg, Trondheim (NO); Inge Hjelkrem, Trondheim (NO); Dag Kvamsdal, Trondheim (NO)

(73) Assignee: Natco Norway AS, Trondheim (NO)

( * ) Notice: Subject to any disclaimer, the term of this patent is extended or adjusted under 35 U.S.C. 154(b) by 248 days.

(21) Appl. No.: 12/280,997

(22) PCT Filed: Mar. 23, 2007

(86) PCT No.: PCT/NO2007/000113

§ 371 (c)(1),
(2), (4) Date: Sep. 15, 2008

(87) PCT Pub. No.: WO2007/108704

PCT Pub. Date: Sep. 27, 2007

(65) Prior Publication Data

US 2009/0049809 A1 Feb. 26, 2009

(30) Foreign Application Priority Data

Mar. 23, 2006 (NO) .................................. 20061339

(51) Int. Cl.
*B01D 45/12* (2006.01)
*B01D 50/00* (2006.01)

(52) U.S. Cl. ............................. 55/319; 55/337; 55/347; 55/348; 55/418

(58) Field of Classification Search ................... 55/319, 55/337, 343, 346, 347, 348, 349, 418
See application file for complete search history.

(56) References Cited

U.S. PATENT DOCUMENTS 4,767,424 A * 8/1988 McEwan ..................... 55/329
6,902,593 B2 6/2005 Miller et al.
7,163,626 B1 1/2007 Cuypers et al.

FOREIGN PATENT DOCUMENTS

EP 1452233 A1 * 9/2004

* cited by examiner

*Primary Examiner*—Robert A Hopkins
(74) *Attorney, Agent, or Firm*—Dennison, Schultz & MacDonald

(57) ABSTRACT

Axial flow demisting cyclone for separation of material compositions of gas, liquid and particulate solids comprising an inlet conduit (18) for the material composition and an outlet conduit (19) for the substantially dry and clean gas, and a swirl facilitating device (20) that sets the entering material composition in rotation. The cyclons comprises a mainly cylindrical tube (11) which is provided with slots or perforations (21) to allow parts of the material composition, hereunder liquids and particulate solids to flow out from the cyclone tube (11) and into a substantially closed chamber (22) which is delimited by an inlet plate (24), by an outlet plate (23) ad by a circumferential plate (12). The chamber (22) has a deposition surface (25) which is geodetically the lower, inner surface of the chamber (22) ad which has an inclination relative to the horizontal plane so that particulate solids will not accumulate on the deposition surface but slide to one or more drainage outlets (14) in the deposition surface (25) arranged to convey liquids and particulate solids out from the substantially closed chamber (22) into a drainage pipe the lower end of which is positioned under the liquid surface of the separator liquid compartment.

10 Claims, 11 Drawing Sheets

SEPARATOR WITH AXIAL FLOW DEMISTING CYCLONE FOR SEPARATION OF MATERIAL COMPOSITIONS OF GAS, LIQUID AND PARTICULATE SOLIDS

BACKGROUND OF THE INVENTION

The present invention concerns separation of liquids and particulate solids from a stream of gas, particularly in a production process of oil and gas. More specifically the present invention concerns a separator for separation of material compositions of gas, liquids and particulate solids with a separator comprising axial flow demisting cyclones for the final removal of liquids and particulate solids before the gas is discharges from the separator. The axial flow demisting cyclones has a drainage system ensuring that liquids and sand will not be able to accumulate any where in the axial flow demisting cyclones or drainage channels but will instead be directed along with any liquid present into the separator liquid compartment.

In the production of oil and gas from a subterranean or subsea reservoir the well production flow almost always will contain water and a little sand along with oil and gas. For this reason a plant for receiving and separating the individual phases are arranged. The separation is conducted in different steps, a "coarse" separation utilizing only gravity and "fine" separation utilizing centrifugal forces and moment of inertia along with gravity. The separation is conducted in large separators arranged either horizontally or vertically.

In separators several steps of liquid separation can be performed. Firstly the gas is fed through an inlet conduit which for vertical separators can be about at the middle of the separator's vertical extension. At the inlet a baffle plate or a vane diffuser is typically arranged to distribute the inlet flow over the separator cross-section. Already at this stage the largest drops are separated out and fall into a liquid reservoir in the lower part of the separator.

The gas flow moves upwards in what can be denoted a calm zone or deposition zone where further drops of liquid are caused by gravity to fall down to the liquid surface below, possibly after having been deposited on the separator wall and drained along the wall surface.

Close to the outlet at the top of the separator the gas is brought to flow through a number of parallel demisting cyclones or other demisting equipment of prior art technology for removal of drops and particulate solids which are not separated from the gas flow by gravity. From the demisting cyclones the liquid and particulate solids is directed into a manifold system and directed further down into the liquid reservoir below through one or more drainage pipes the lower end of which are positioned below the liquid surface of the liquid reservoir at the lower end of the separator. Norwegian patent 320 351 shows examples of embodiments of such separators and in this publication is also explained the total requirement for having the lower end of the drainage pipes arranged below the liquid surface of the liquid reservoir at the separator lower end. At high pressure drops from the cyclone inlet to the cyclone drainage chamber there will be a corresponding sectional force in the drainage pipe which results in a higher liquid level in the drainage pipe than in the reservoir. If the pressure drop becomes too high, liquid is sucked up through the drainage pipe instead of being drained downwards through the pipe. If (the lower end of) the drainage pipe is not immersed in the liquid phase the sub-pressure in the cyclone drainage chamber will result in a gas flow upwards in the drainage pipe that counteracts the drainage and partly or completely prevents separation.

The arrangement of demisting cyclones here described is characterized in that the liquid separated out is led back to the same chamber and thus the same pressure as the cyclones are being fed from. The arrangement with the immersed drainage pipes which have a function of a liquid seal is decisive for the functionality of the arrangement.

Two main types of demisting cyclones are known. One type is characterized by a change of flow direction of the gas within the demisting cyclone and is referred to as reverse flow demisting cyclone while another has only one direction of flow and s referred to as an axial flow demisting cyclone or simply axial cyclone. Both these types are discussed in NO 315188. While the first type is characterized by an undesired high pressure drop the axial flow demisting cyclone has a lower pressure drop and is better suited for the final demisting in separators.

On the other hand reverse flow demisting cyclones are better suited for taking care of particulate material because the particles will be conveyed vertically downwards, i.e. in the direction aided by gravity, along with separated liquids. Solid particulates and liquid will thus not be able to accumulate in the cyclone or in the drainage system.

This is not the case for axial flow demisting cyclones where liquid and particulate solids will be able to accumulate within the drainage system of the cyclone arrangement unless the arrangement is made according to the resent invention. A number of axial flow demisting cyclones are normally arranged in a cassette, typically four cyclones per cassette. The cassettes can be arranged so that the cyclones have their longitudinal direction either in the horizontal or in a vertical plane. Each cassette has a drainage conduit which is connected to a common, horizontally arranged manifold which again is communicating with one or more vertically oriented drainage pipes which convey the separated fluid down into the separator liquid compartment.

For axial flow demisting cyclones it is a problem that particulate solids accumulate in horizontal sections within the cassettes themselves as well as in the horizontal oriented manifold. This may lead to blockage of the drainage pipes that completely or partly prevents the liquid from being drained and thus jeopardizes the function of the demisting equipment. This is of particular importance for separators to be operated at the sea bottom where there is no possibility of cleaning the drainage system.

Another problem associated with axial flow demisting cyclones where part of the gas is recycled, is that the liquid film formed at the bottom of the cassette may be sucked up and follow the recycle gas into the cyclone. Small deviations in the horizontal arrangement of the cyclones may lead to a "thick" layer of liquid in the corner furthest away from the drainage conduit. Particularly cyclones with a horizontal arrangement may be vulnerable to this negative effect of inclined installation because the horizontal distance between drainage conduit and the corners of the cassette is especially large. For a standard embodiment of a cyclone cassette the liquid film will be quite close to the cyclone tube and the risk of entrainment of liquid will be present because the liquid and gas impulse out of the cyclone tube will penetrate (into) the liquid layer.

SUMMARY OF THE INVENTION

It is an object of the present invention to provide an arrangement for separators comprising axial flow demisting cyclones to prevent that liquid which has been separated from the gas is sucked back into the cyclones and to prevent blockage of drainage pipes resulting from accumulating solid particulates.

It is furthermore an object to provide an arrangement for separators as described which is maintenance-free over a long period of time, preferably for a period of several years.

The mentioned arrangement of demisting cyclones herein described is characterized by the feature that the separated liquid is drained back to the same volume and thus the same pressure as the cyclones is fed from.

The separator according to the invention comprises a bundle of parallel axial flow demisting cyclones, hereinafter denoted axial cyclones, in which each cyclone has an inlet conduit for gas with entrained drops of liquid and/or particulate solid material and an outlet conduit for a substantially dry gas with a substantially cylindrical cyclone tube and comprising a swirl facilitating device which sets the entering fluid material in rotation, the demisting cyclones being characterized by comprising perforations to allow separated liquid and/or particulate solids to flow out from the cyclone tube into a closed chamber. Several cyclones may drop liquid and particulate solids to the same closed chamber. The closed chamber is delimited by an inlet plate, an outlet plate and a circumferential plate. The arrangement described in which plural cyclones share a common closed chamber for accumulation of liquid and particulate solids is hereinafter referred to as a cyclone cassette. A cyclone cassette typically contains 4 axial cyclones but this number may vary significantly.

Liquid and particulate solids will deposit on the cyclone cassette deposition surface defined to be the geodetically lowest surface in the cyclone cassette in relation to the gravity force. In a vertical axial cyclone configuration the deposition surface is thus formed by the inside surface of the inlet plate while in a horizontal configuration the deposition surface is represented by the geodetically lower part of the circumferential plate. The outlet plate is preferably plane independent of whether the cyclones are arranged vertically or horizontally, while the circumferential plate can have any suitable shape, like cylindrical or with rectangular, triangular or orthogonal cross-section. For a horizontal axial cyclone orientation the circumferential plate is according to the invention shaped with a "funnel" the lowest part of which is connected to one or more outlet conduits. For a vertical axial cyclone orientation the inlet plate is according to the invention "funnel shaped" with a lowest level which is connected to one or more drainage conduits.

In accordance with the invention entrainment of liquid collected at the bottom of the cyclone cassette is prevented while also preventing particulate material from being deposited within the closed chamber.

Typically a number of cyclone cassettes are arranged in parallel in a separator. Each one of the cyclone cassettes can have each respective inclined or vertical channel forming a communication between the cyclones' drainage conduits and the separator's liquid compartment.

More convenient is to connect each of the cyclone drainage conduits to one or more inclined or vertical accumulating channels, the lowest point of which is/are communicating with the separator liquid compartment through a vertical or inclined drainage pipe. It is vital that the lower end of the drainage pipe is immersed in the separator liquid compartment to prevent gas from flowing into the cyclone drainage chamber via the drainage pipe.

BRIEF DESCRIPTION OF THE DRAWINGS

Below the invention is described in more detail in the form of a concrete embodiment with reference to the enclosed drawings. To complete the overview embodiments of the prior art is also shown in drawings, where.

DESCRIPTION OF THE PREFERRED EMBODIMENTS

Figure 1:
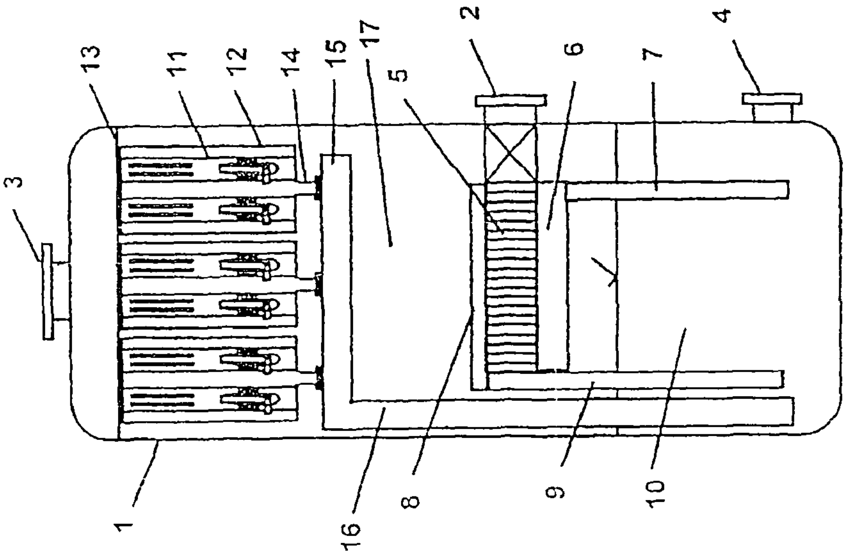
FIGURE1 PRIOR ART
FIG. 1 shows schematically a bundle of parallel axial flow demisting cyclones in a vertical separator in accordance with prior art technology.

FIG. 1 shows a vertical separator according to prior art technology comprising a tank 1, an inlet conduit 2, a gas outlet conduit 3, a liquid outlet conduit 4, an inlet device 5 of any type, a bundle of parallel axial cyclones 11 arranged in a bundle of parallel cyclone cassettes 12. A plate 13 is sealingly arranged against the cyclone cassettes 12 and the tank wall 1 such that all gas must pass through the axial cyclones 11. The example of FIG. 1 is shown with a vane diffuser as inlet device 5 corresponding to the one described in Norwegian patent No. 320 351. The vane diffuser 5 has the purpose of receiving, retarding and distributing entering gas and liquid from the inlet conduit 2 as gently as possible into the separator 1 deposition zone 17. The illustrated, prior art vane diffuser 5 has vanes which separates liquid from the gas before the gas enters the separator deposition zone 17. The liquid is collected in a vessel 6 arranged below the vanes and directed further down to the separator liquid compartment through a drainage pipe 7. Due to the horizontal shape of the vessel 6 particulate materials will tend to accumulate in the vessel with the risk of blocking the drainage pipe 7 so that liquid will no longer be able to separate from the gas in the vane diffuser 5. The illustrated prior art vane diffuser 5 is furthermore provided with a drainage pipe 9 which drains any liquid collected on top of the vane diffuser's top plate 8. Side walls are arranged around the entire top plate 8 to prevent liquid collected on top of the plate 8 to flow down in front of the vane diffuser's 5 outlet. Due to the horizontal shape of the top plate 8 particulate materials may be deposited on this surface with risk of blocking the drainage pipe 9 so that liquid will eventually spill over and flow down in front of the vane diffuser 5 outlet thus jeopardizing the efficiency of the separation. The gas passing through the separator deposition zone 17 will contain many small and some intermediate sized drops when entering the demisting cyclones 11 in which further drops are separated out. Liquid and particulate solids separated out in the axial cyclones 11 is collected in the bottom of the cyclone cassettes 12 which envelopes the axial cyclones 11. Separated liquid and particulate solids are discharged from the cyclone cassettes through a drainage conduit 14 which is in further communication with one or more horizontal oriented collective channels 15 which again are connected to one or more vertically oriented drainage pipes 16. A detailed description of the axial flow cyclone 11 and its typical arrangement in cassettes 12 is provided below. Hereunder is to be emphasized that particulate solids may be deposited at the bottom of the cyclone cassette 12 with risk of blocking drainage conduit 14. Furthermore particulate materials may be deposited within the horizontal oriented collective channel 15 with the risk of blocking drainage pipes 16.

Figures 2A, 2B:
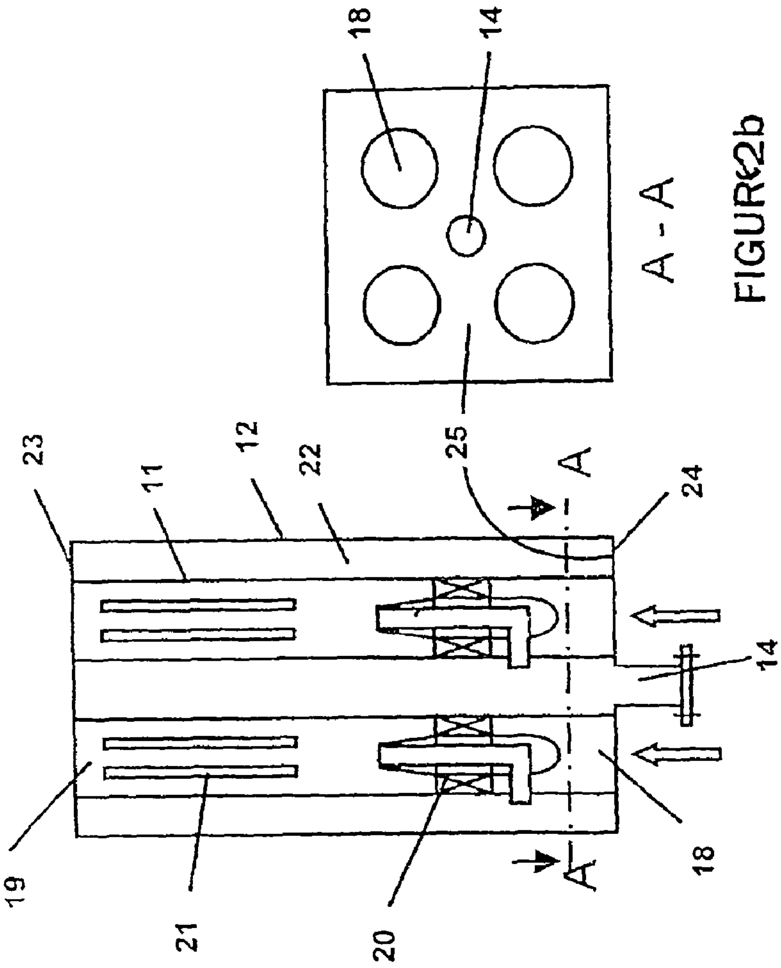
FIGURE 2a PRIOR ART
FIGS. 2*a* and 2*b* show schematically a simplified view of four vertical oriented axial flow demisting cyclones arranged in a cyclone cassette in accordance with prior art technology.

FIGS. 2*a* and 2*b* show a typical prior art vertical arrangement of axial cyclones in cassettes as e.g. described in Norwegian patent No. 314 751.

FIG. 2*a* is a cross-sectional view of the cyclone cassette in the longitudinal direction of the cyclone tubes 11 while FIG. 2*b* is a cross-sectional view o the cyclone cassette perpendicular to the longitudinal direction of the cyclone tubes 11. In the example illustrated there are 4 axial cyclones but the number can vary significantly. Each axial cyclone has a gas inlet 18 for gas containing drops of water and or solid particulate material and an outlet for substantially dry gas, a mainly cylindrical cyclone tube 11 as well as a swirl facilitating device 20 which sets the entering fluid in rotation. The demisting cyclones are characterized in that the cyclone tube 11 has perforations 21 to allow separated liquid and/or particulate solids to flow out from the cyclone tube 11 and into a closed chamber 22. All 4 axial cyclones as illustrated in the example deliver liquid and particulate material to the closed chamber 22. As described in Norwegian patent No. 213 751 and illustrated in FIGS. 2*a* and 2*b* it is common to recycle parts of the gas by arranging a (fluid) communication channel between the closed chamber 22 and the centre of the cyclone tube 11. The recycle flow is facilitated due to the radial pressure gradient within the cyclone tube 11 in which the lowest pressure is at the centre of the cyclone tube. As described in Norwegian patent No. 314 751 the recycle flow is used to purge liquid out through the perforations 21 as well as to prevent creep flows of liquid collected on the core body of the swirl facilitating device 20. The closed chamber 22 is delimited by an outlet plate 23, an inlet plate 24 and a circumferential plate 12. Liquid and particulate solids will be deposited on the cyclone cassette deposition surface 25 defined to be the geodetically lowest surface in the cyclone cassette in relation to the gravity force. In a vertical arrangement of axial cyclones the deposition surface 25 is thus constituted by the inner surface of the inlet plate 24.

The inlet plate/deposition surface 24/25 and the outlet plate 23 are horizontal and plane while the circumferential plate 12 is constituted by four rectangular plate elements. In the inlet plate/deposition surface 24/25 a drainage conduit 14 is arranged to convey liquid and particulate material out from the closed chamber 22.

As previously commented the liquid film collected on the cyclone cassette deposition surface may be sucked up by and follow the recycle gas back into cyclone tube 11.

As previously commented also particulate material may be deposited on the cyclone cassette inlet plate/deposition surface 24/25 with the risk of blocking drainage conduit 14.

Figures 3A, 3B:
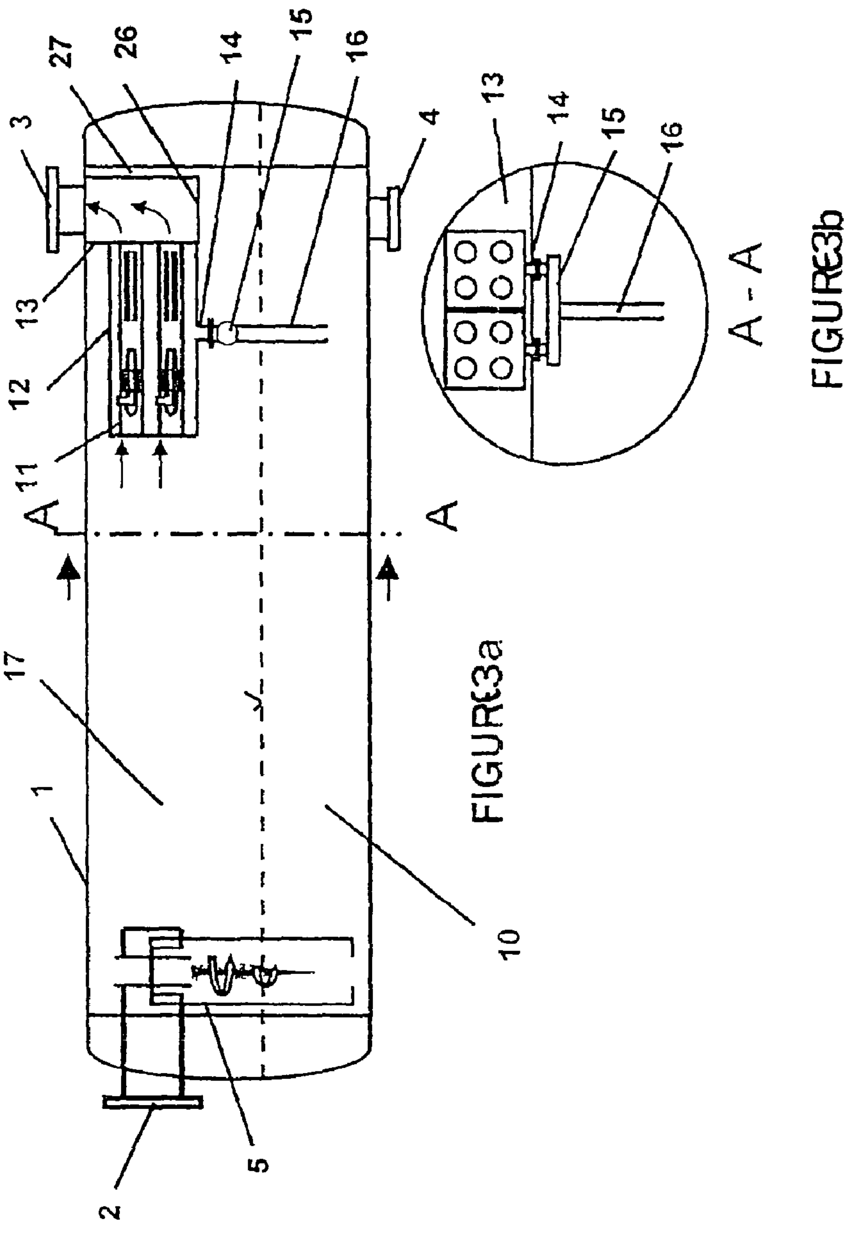
FIGURE3b PRIOR ART
FIGS. 3*a* and 3*b* show schematically an arrangement of a bundle of parallel axial flow demisting cyclones in a horizontal, in accordance with prior art technology, in a horizontal separator.

FIGS. 3*a* and 3*b* show a horizontal separator according to prior art technology comprising a tank 1, an inlet conduit 2, a gas outlet conduit 3, a liquid outlet conduit 4, an inlet device 5 in the form of an inlet cyclone, a bundle of parallel axial cyclones 11 arranged in a bundle of parallel cyclone cassettes 12. FIG. 3*a* is a cross-sectional view of the separator in its longitudinal direction while FIG. 3*b* is a cross-sectional view of the separator perpendicular to its longitudinal direction. A plate 13 is sealingly arranged against the cyclone cassettes 12 and the tank wall 1 which together with a bottom plate 26 and "opposite" side plate 27 ensure that all gas must pass through the axial cyclones 11. A functional description of the separator is provided below. The example from FIG. 3 is illustrated with an inlet cyclone constituting the inlet device 5 corresponding to one described in Norwegian patent application No. 2004 1073. The inlet cyclone 5 has a purpose of separating entering mixtures of gas and liquid and distributing the entering gas and liquid as gently as possible to the separator deposition zone 17 and liquid compartment 10. The gas passing through the separator deposition zone 17 contains a lot of small and some intermediate sized drops when entering the demisting cyclones 11 in which further drops of liquid is separated out. Liquid and particulate solids separated in the axial cyclones 11 are collected at the bottom of the cyclone cassettes 12 enveloping the axial cyclones 11. Separated liquid and particulate solids are conveyed out from the cyclone cassettes via drainage conduit 14 which is further connected to one or more horizontally oriented collective channels 15 which again are connected to one or more vertically oriented drainage pipes 16. A detailed description of the axial cyclone 11 and their arrangement in cassettes 12 in a horizontal arrangement is provided below. Here is only emphasized that liquid may be sucked up from the liquid layer deposited on the cyclone cassette deposition surface 25 and conveyed back to the cyclone along with recycle gas while particulate solids may accumulate at the bottom of the cyclone cassette with the risk of blocking drainage conduit 14. Furthermore particulate materials may be deposited in the horizontally oriented collective channel(s) 15 with the risk of blocking drainage pipes 16.

Figures 4A, 4B:
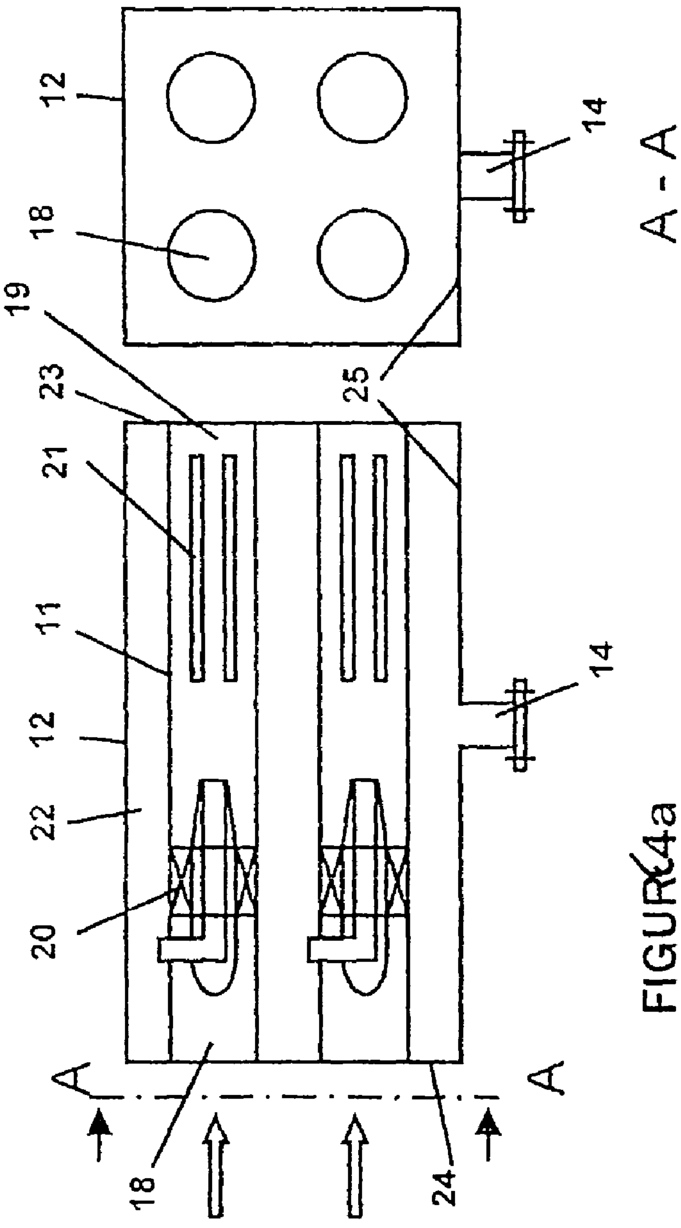
FIGURE 4a PRIOR ART
FIGS. 4*a* and 4*b* show schematically a simplified view of four horizontal oriented axial flow demisting cyclones being arranged in a cyclone cassette in accordance with prior art technology.

FIGS. 4*a* and 4*b* show a typical arrangement of axial cyclones arranged in a horizontal arrangement in cyclone cassettes according to prior art technology. FIG. 4*a* is a cross-sectional view of the cyclone cassette in the longitudinal direction of the cyclone tubes 11 while FIG. 4*b* is a cross-sectional view of the cyclone cassette perpendicular to the longitudinal direction of the cyclone tubes 11. Each axial cyclone has an inlet 18 for gas containing liquid drops and/or particulate solids and an outlet 19 for substantially dry gas with a mainly cylindrical cyclone tube 11 and comprising a swirl facilitating device 20 which sets the entering fluid in rotation. In the cyclone tube 11 of the demisting cyclone perforations 21 are arranged to allow separated liquid and/or particulate solids to flow out from the cyclone tube 11 into a closed chamber 22. All 4 axial cyclones according to this example deliver liquid and particulate solids to a common closed chamber 22. The closed chamber 22 is delimited by an outlet plate 23, an inlet plate 24 and a circumferential plate 12. Liquid and particulate solids are deposited on the cyclone cassette deposition surface 25 defined to be the geodetically lowest surface in the cyclone cassette in relation to the gravity force. The inlet plate 24 and the outlet plate 23 are vertical and plane while the circumferential plate 12 is constituted by rectangular plate elements. The deposition surface 25 is constituted by the inside of the geodetically lowest one of the rectangular plate elements forming the circumferential plate 12 and is horizontal and plane. From the deposition surface 25 a drainage conduit 14 is arranged to convey liquid and particulate solids out from the closed chamber 22. As previously emphasized the liquid film formed at the cyclone cassette deposition surface 25 may be sucked up by and entrained in the recycle gas back to the cyclone tube 11. Particularly cyclones which are arranged horizontally are vulnerable to this negative effect since even small deviations from the horizontal arrangement will lead to a comparatively "thick" layer of liquid in the corner furthest away from the drainage conduit 14. With a standard embodiment of the cyclone cassette the liquid layer will be quite close to the cyclone tube 11 and the risk of entrainment is certainly present. The problem with liquid entrainment can partly be solved by increasing the distance between the cyclone tube 11 and the cyclone cassette deposition surface 25, but this leads to an increase in the height of the cassette which is particularly undesired for horizontal installations since available drainage height to the liquid surface already is quite limited. The problem of accumulation of particulate solids on the cyclone cassette deposition surface 25 will not be reduced by simply increasing the distance between the cyclone tubes 11 and the cyclone deposition surface 25.

Figures 5A, 5B:
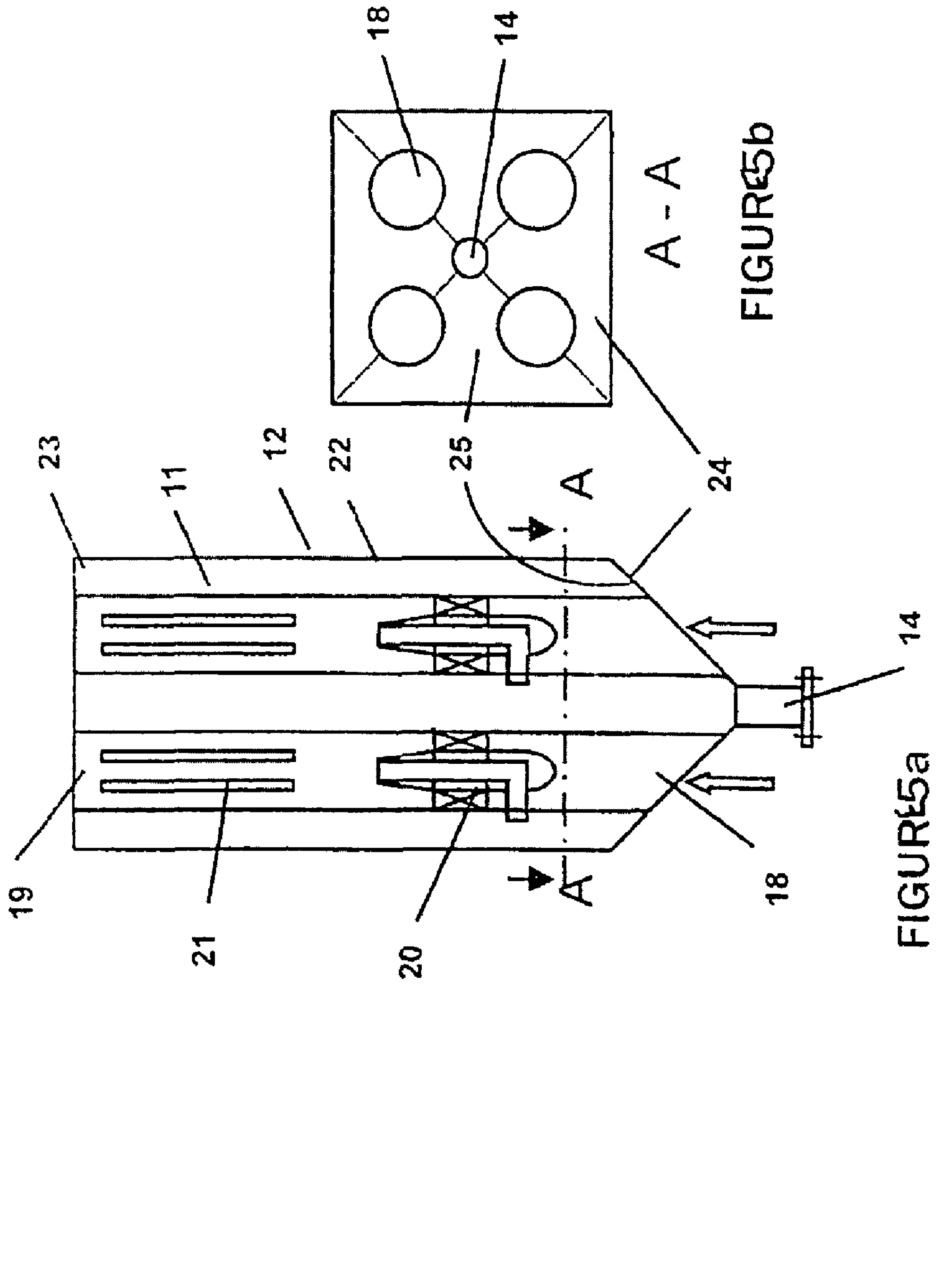
FIGS. 5*a* and 5*b* show in accordance with the present invention an exemplifying embodiment of a bundle of parallel axial flow demisting cyclones arranged in a vertical cyclone cassette.
Figure 6:
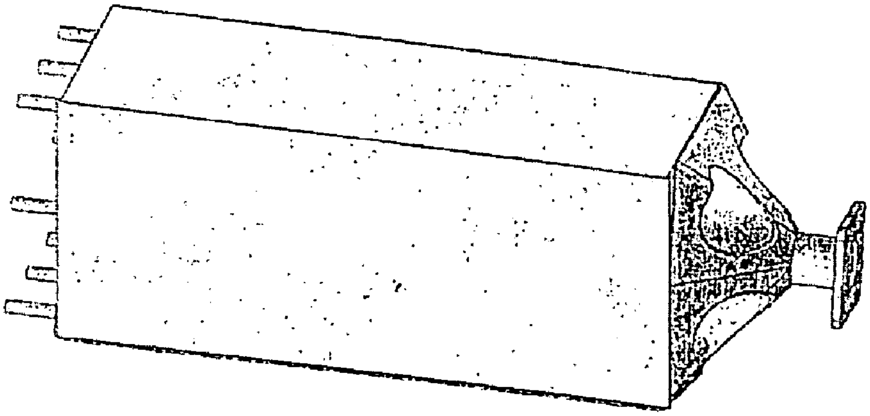
FIG. 6 shows a 3 dimensional illustration of an arrangement of a bundle of parallel axial flow demisting cyclones in a vertical cyclone cassette in accordance with the present invention.

FIGS. 5*a* and 5*b* show schematically a preferred embodiment of a vertically oriented cyclone cassette in accordance with the invention. FIG. 5*a* is a cross-sectional view of the cyclone cassette in the longitudinal direction of the cyclone tubes 11 while FIG. 5 is a cross-sectional view of the cyclone cassette perpendicular to the longitudinal direction of the cyclone tubes 11. In the example shown there are 4 axial cyclones but the number can be varied significantly. Each axial cyclone has an inlet 18 for gas containing liquid drops and/or particulate material and an outlet 19 for a substantially dry gas, with a mainly cylindrical cyclone tube 11 as well as a swirl facilitating device 20 to set the entering fluid in rotation. In the cyclone tube 11 of the demisting cyclone perforations 21 are arranged to allow separated liquid and/or particulate solids to flow out from the cyclone tube into a closed chamber 22. All four axial cyclones as shown deliver liquid and particulate solids to a common closed chamber 22. The closed chamber 22 is delimited by an outlet plate 23, an inlet plate 24 and a circumferential plate 12. Liquid and particulate solids will deposit on the cyclone cassette deposition plate 25 defined to be the geodetically lowest surface in the cyclone cassette in relation to the gravity force. With a vertical arrangement of the axial cyclones the deposition surface 25 will thus be constituted by the inside of the inlet plate 24. The outlet plate 23 is in a preferred embodiment horizontal and plane. The circumferential plate 12 according to this example is rectangular but can have any shape like cylindrical or triangular. It is a characterizing feature that the inlet plate/deposition surface 24/25 is funnel shaped so it is impossible for a thick layer of liquid to accumulate on this surface as well as accumulation of solid particles on the inlet plate/deposition surface 24/25. Instead the liquid and the particulate materials will slide towards one or more drainage conduits 14 arranged from the inlet plate/deposition surface 24/25 to convey liquid and particulate solids out from the closed chamber 22 into a drainage pipe 16 the lower end of which is immersed in the separator liquid compartment 10. The design of the funnel shaped deposition surface can vary significantly. It can be designed with four plane plates such as illustrated in FIG. 6 but the four plates can also be curved so that the angle of inclination varies along the fall-line. If the cyclone cassette is circular the deposition surface 25 will preferably have a conical shape tapered downwards towards the outlet conduit 14. The conical plate will thus have the shape of a funnel whose angle of inclination can be constant or possibly varying in the direction of the fall-line.

The inclination angle of the deposition surface 25 should preferably be higher than the angle of repose for sand but this is not a requirement since the flow of liquid will help transporting the particulate solids towards the drainage conduit. The liquid separated will also be deposited on the deposition surface and form a layer of liquid flowing towards the drainage conduit. There will thus be a drag force between the liquid layer and particles, in addition to the gravity force, to contribute to the transportation of solid particulates towards the drainage conduit 14. One is thus able to avoid accumulation of sand on the deposition surface at inclination angles which are significantly smaller than the angle of repose for sand. The angle of repose for sand is in the range 25 to 45 degrees dependent upon substance and moisture content. In a preferred embodiment the inclination angle is larger than 10 degrees in relation to the horizontal plane ad more preferred larger than 25 degrees.

FIG. 6 is a perspective drawing of the cyclone cassette shown in FIG. 5.

Figures 7A, 7B:
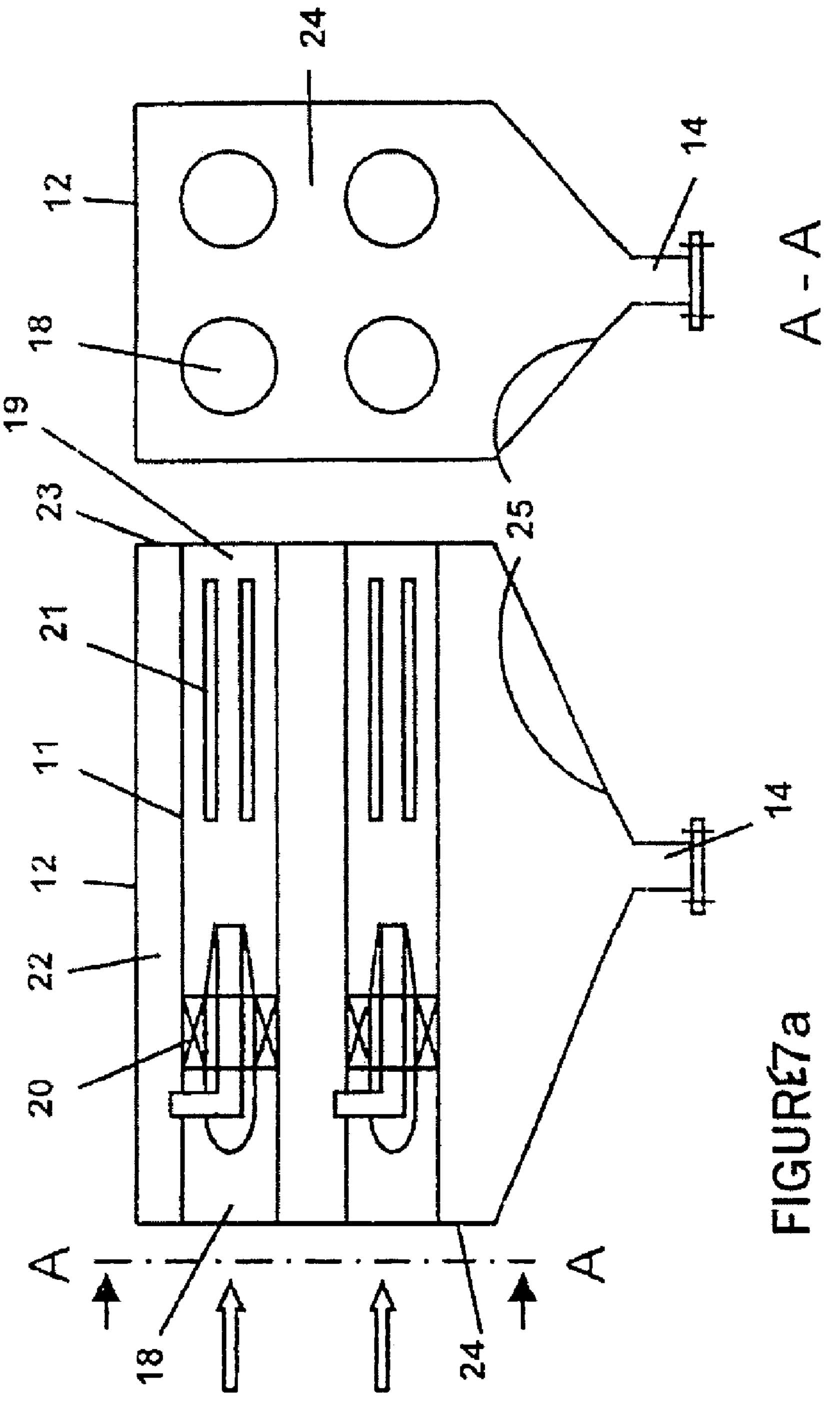
FIGS. 7*a* and 7*b* show a preferred embodiment of an arrangement according to the present invention of a bundle of parallel axial flow demisting cyclones in a horizontal cyclone cassette.
Figures 8A, 8B:
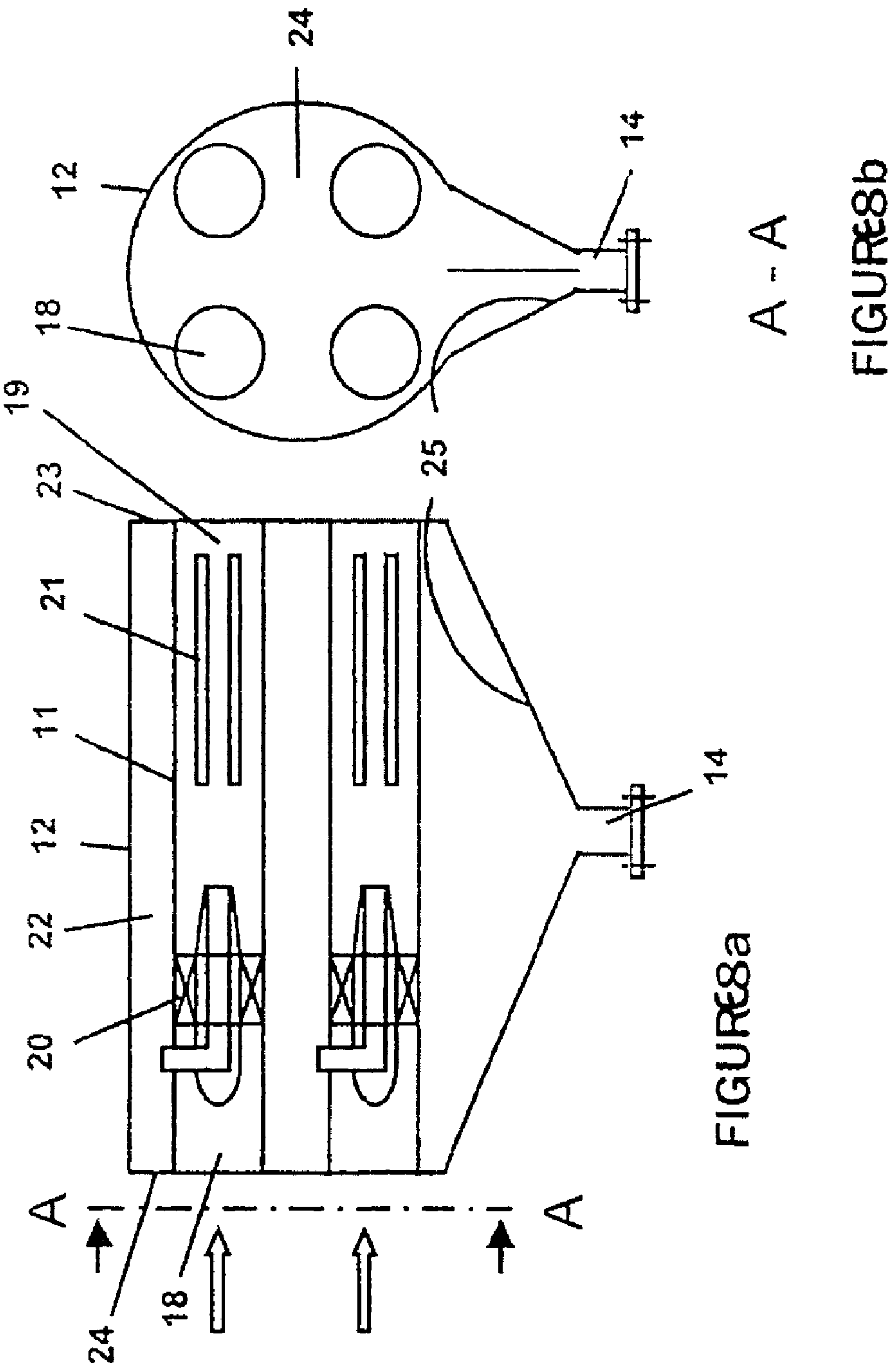
FIGS. 8*a* and 8*b* show another example of an arrangement according to the present invention of a bundle of parallel axial flow demisting cyclones in a horizontal cyclone cassette.
Figures 9A, 9B:
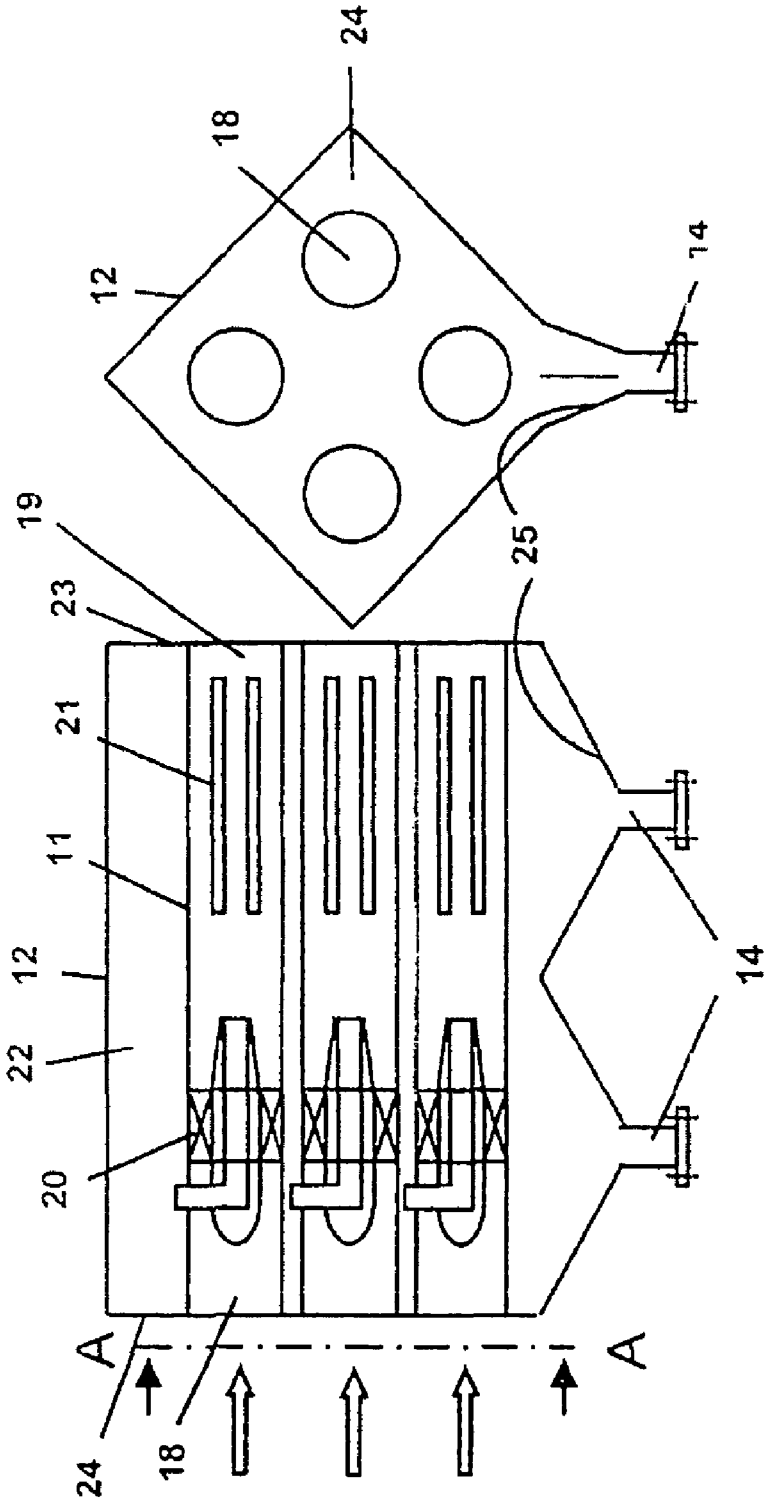
FIGS. 9*a* and 9*b* show a third example of an arrangement according to the present invention of a bundle of parallel axial flow demisting cyclones in a horizontal cyclone cassette.

FIGS. 7*a/b*, 8*a/b* and 9*a/b* show schematically examples of a horizontally oriented cyclone cassette according to the invention. FIGS. 7*a*, 8*a*, and 9*a* show a cross-section of the cyclone cassette in the longitudinal direction of the cyclone tubes 11 while FIGS. 7*b*, 8*b*, and 9*b* show a cross-section of the cyclone cassette perpendicular to the longitudinal direction of the cyclone tubes 11. Each axial cyclone has an inlet 18 for entering gas containing drops of liquid and/or particulate solids and an outlet 19 for a substantially dry gas with a mainly cylindrical cyclone tube 11 as well as a swirl facilitating device 20 to set the entering fluid in rotation. In the cyclone tube 11 of the demisting cyclone perforations 21 are arranged to allow separated liquid and/or particulate material to flow out from the cyclone tube into a closed chamber 22. All four axial cyclones as shown deliver liquid and particulate material to a common closed chamber 22. The closed chamber 22 is delimited by an outlet plate 23, an inlet plate 24, and a circumferential plate 12. Liquid and particulate solids will deposit on the cyclone cassette deposition surface which is defined to be the geodetically lowest surface in the cyclone cassette in relation to the gravity force. The inlet plate 24 and the outlet plate 23 are vertical and preferably plane while the circumferential plate 12 can have any suitable shape like cylindrical or delimiting a triangular or rectangular cross-section. The feature characteristic of the deposition surface 25 according to the present invention is that it is shaped as a funnel to avoid the possibility of a thick layer of liquid being formed thereon as well as avoiding accumulation of particulate solids thereon. Instead the liquid and the particulate solids will slide towards one or more drainage conduits 14 being arranged from the deposition surface 25 to convey liquid and particulate solids out from the closed chamber 22 into a drainage pipe 16 the lower end of which is immersed in the separator liquid compartment 10. It is shown by the FIGS. 7-9 that different geometrical constructional solutions can be used to obtain said characterizing feature. Also other geometrical designs, not shown, are possible.

Figure 10:
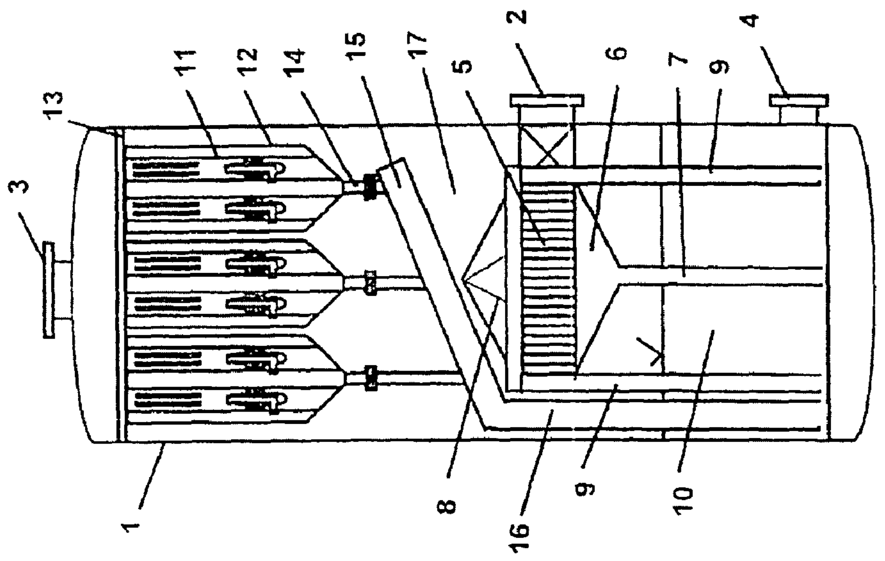
FIG. 10 shows a preferred embodiment of an arrangement according to the present invention of a bundle of parallel axial flow demisting cyclones in a vertical separator, FIGS. 11 *a* and 11 *b* show a preferred embodiment of an arrangement of a bundle of parallel axial flow demisting cyclones according to the present invention in a horizontal separator.

FIG. 10 shows a preferred embodiment of the invention with a bundle of vertically arranged cyclone cassettes in a vertical separator, comprising a tank 1, an inlet conduit 2, a gas outlet conduit 3, a liquid outlet conduit 4, an inlet device 5 of any type, a bundle of parallel oriented axial cyclones 11 being arranged in a bundle of parallel oriented cyclone cassettes 12. A plate 13 is sealingly arranged between the cyclone cassettes 12 and the tank wall 1 to ensure that all gas must pass through the axial cyclones 11. A functional description of the separator is provided below. The example of FIG. 10 is illustrated with an inlet device in the form of a vane diffuser 5 corresponding to Norwegian patent No. 320 351. The purpose of the vane diffuser 5 is to receive, retard and distribute entering gas and liquid through the inlet conduit as gently as possible into the separator deposition zone 17. The illustrated vane diffuser 5 has vanes which separates liquid from gas already before the gas enters the deposition zone 17. The liquid is collected in a vessel 6 arranged below the vanes and conveyed further down to the separator liquid compartment 10 through a drainage pipe 7. In a preferred embodiment the bottom plate I the vessel 6 is funnel shaped so that particulate material not will accumulate thereon but instead will slide towards one or more drainage channels 7 arranged from the bottom plate of the vessel 6 to convey liquid and particulate solids out from the vessel 6.

The illustrated vane diffuser is furthermore furnished with a drainage channel 9 that drains liquid collected on top of the vane diffuser's top plate 8. Side walls are arranged all around the circumference of the top plate 8 to prevent liquid collected on the top plate from flowing down in front of the vane diffuser's 5 outlet. In a preferred embodiment the top plate 8 has the form of a pyramid so that particulate material not will be able to accumulate on this surface but will slide towards one or more drainage channels 9 conveying liquid and particulate material out of the open vessel defined by the top plate 8 and the side walls around the circumference of the top plate 8.

The gas passing thorough the separator deposition zone 17 contains a lot of small and some intermediate sized drops when it enters the demisting cyclones 11 in which further drops are separated. Liquid and particulate solids separated out by the axial cyclones 11 are collected in the funnel shaped bottom plate of the cyclone cassette 12. Separated liquid and particulate solids are conveyed from the cyclone cassettes via a drainage conduit 14 which again is connected to one or more inclined collective channels 15 which again is/are connected to one or more vertically oriented drainage pipes 16 the lower end of which is immersed in the liquid reservoir 10 at the bottom of the separator 1. The collective channel 15 will in a preferred embodiment have an inclination which is larger than the 20 degrees to prevent particular material to accumulate therein with the risk of blocking drainage pipe(s) 16.

The arrangement of demisting cyclones here described is characterized by the feature that the separated liquid is conveyed back to the compartment represented by the separator deposition zone 17 and the separator liquid compartment 10 and thus the same pressure from which the cyclones are fed. The arrangement with the (partly) immersed drainage pipe 16 which functions as a liquid seal is thus decisive for the functionality of the arrangement.

Figure 11A:
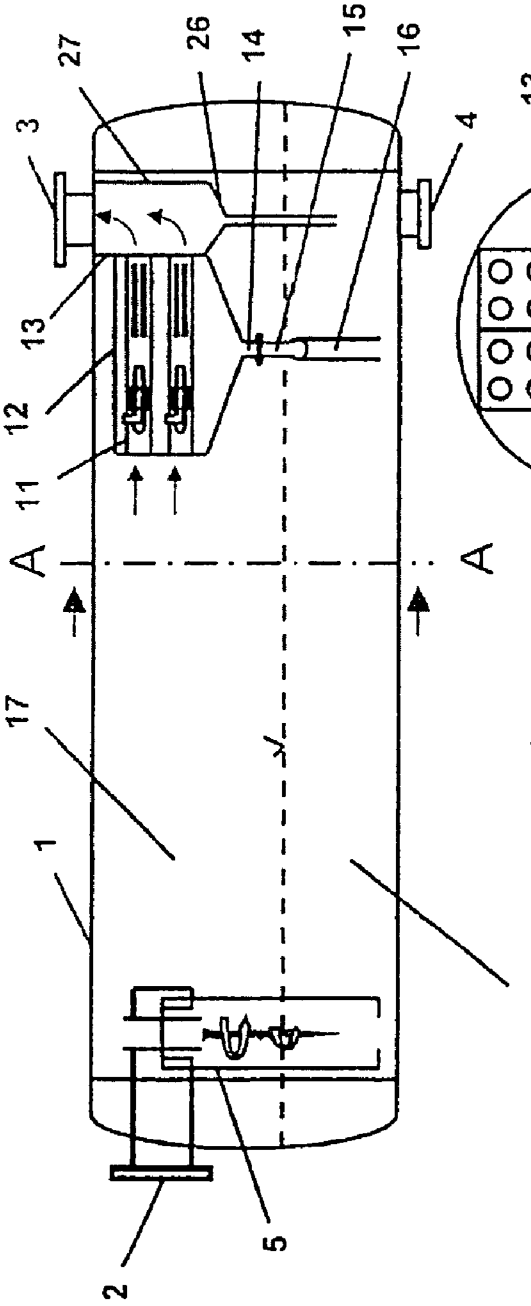
Figure 11B:
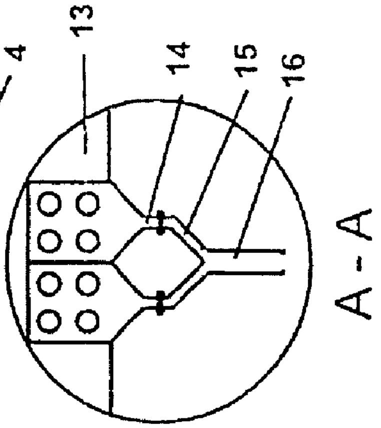

FIGS. 11*a* and 11*b* show a preferred embodiment of the arrangement of a bundle of parallel, horizontally oriented cyclone cassettes according to the invention in a horizontal separator comprising a tank 1, an inlet conduit 2, a gas outlet conduit 3, a liquid outlet conduit 4, an inlet device 5 of any suitable type, a bundle of parallel axial cyclones 11 arranged in a bundle of parallel oriented cyclone cassettes 12. FIG. 11*a* is a cross-sectional view of the separator 1 in its longitudinal direction while FIG. 11*b* is a cross-sectional view of the separator perpendicular to its longitudinal direction. A plate 13 is sealingly arranged against the cyclone cassettes 12 and the upper wall of the tank 1 which together with a bottom plate 26 and an opposite side plate 27 ensures that all gas must pass through the axial cyclones 11. A functional description of the separator is provided below. The example as shown in FIG. 11 is illustrated with an inlet cyclone as the inlet device 5 as described in Norwegian patent application No. 2004 1073. The purpose of the inlet cyclone is to separate entering gas/liquid mixture and distribute the entering gas and liquid as gently as possible in the separator deposition zone 17 and liquid compartment 10 respectively. The gas passing through the separator deposition zone 17 contains many small and some intermediate sized drops when entering the demisting cyclones 11 in which further drops are separated. Liquid and particulate solids which are separated out by the axial cyclones 11 are collected at the bottom of the cyclone cassettes 12. Separated liquid and particulate solids are conveyed out from the cyclone cassettes via a drainage conduit 14 which is further connected to one or more inclined or vertically oriented collective channels 15 which again are connected to one or more vertically oriented drainage pipes 16 the lower end of which is immersed in the liquid compartment 10 of the separator 1.

The invention claimed is:

1. Separator for separation of a material composition comprising gas, liquid and solid particulates, comprising:

an inlet conduit arranged to convey the material composition into the separator, a separator liquid compartment in which a majority of the liquid and the solid particulates are collected after being separated out by gravity, at least one parallel, axial flow demisting cyclone for separating remaining liquid and solid particulates from the gas, comprising an inlet for the material composition in communication with a gas compartment of the separator and an outlet for substantially dry and clean gas, a swirl facilitating device which sets the entering material composition in rotation, and a substantially cylindrical cyclone tube provided with slots or perforations to allow parts of the composition to flow out from the cyclone tube and into a substantially closed chamber being limited by an outlet plate, an inlet plate and a circumferential plate, the chamber having a deposition surface which is geodetically a lower, inner surface of the chamber, wherein the deposition surface is arranged with an inclination in relation to a horizontal plane such that the particulate material will not accumulate on thereon, but slide towards at least one drainage conduit arranged from the deposition surface to convey liquid and solid particulates out from the closed chamber and into a drainage pipe having a lower end immersed in the separator liquid compartment.

2. Axial flow demisting cyclone as claimed in claim 1, wherein the deposition surface comprises at least two adjacent, plane sub-surfaces.

3. Axial flow demisting cyclone as claimed in claim 2, wherein the deposition surface comprises four plane sub-surfaces which together form a funnel in a direction towards the drainage outlet.

4. Axial flow demisting cyclone as claimed in claim 2, wherein the deposition surface comprises at least two adjacent, curved sub-surfaces.

5. Axial flow demisting cyclone as claimed in claim 2, wherein the deposition surface comprises at least two adjacent sub-surfaces which are partly plane and partly curved.

6. Axial flow demisting cyclone as claimed in claim 1, wherein at least one deposition surface is conically tapered in a direction towards the drainage conduits.

7. Axial flow demisting cyclone as claimed in claim 1, wherein the deposition surface has an inclination in a fall line which is greater than 10° in relation to the horizontal plane.

8. Axial flow demisting cyclone as claimed in claim 7, wherein the inclination is at least 25° in relation to the horizontal plane.

9. Axial flow demisting cyclone as claimed in claim 1, wherein the deposition surface has an even inclination from an uppermost end down to the at least one drainage conduit.

10. Axial flow demisting cyclone as claimed in claim 1, wherein the deposition surface has a varying inclination from an uppermost end to down to the at least one drainage conduit.

* * * * *